United States Patent
Potapenko et al.

(10) Patent No.: US 11,927,230 B2
(45) Date of Patent: Mar. 12, 2024

(54) FRICTION BRAKE BODY FOR A FRICTION BRAKE, FRICTION BRAKE AND METHOD FOR PRODUCING A FRICTION BRAKE BODY

(71) Applicant: Robert Bosch GmbH, Stuttgart (DE)

(72) Inventors: Ilja Potapenko, Biedenkopf (DE); Christian Schnatterer, Oberursel (DE); Thomas Pfeiffer, Steffenberg (DE); Kangjian Wu, Marburg (DE); Simon Loskyll, Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 17/611,218

(22) PCT Filed: May 15, 2020

(86) PCT No.: PCT/EP2020/063595
§ 371 (c)(1),
(2) Date: Nov. 15, 2021

(87) PCT Pub. No.: WO2020/234147
PCT Pub. Date: Nov. 26, 2020

(65) Prior Publication Data
US 2022/0213940 A1 Jul. 7, 2022

(30) Foreign Application Priority Data
May 18, 2019 (DE) ...................... 10 2019 207 291.7

(51) Int. Cl.
*F16D 65/12* (2006.01)
*B32B 15/01* (2006.01)
(Continued)

(52) U.S. Cl.
CPC .......... *F16D 65/125* (2013.01); *B32B 15/011* (2013.01); *F16D 65/127* (2013.01);
(Continued)

(58) Field of Classification Search
CPC ............ B32B 2250/02; B32B 2475/00; B32B 2605/00; F16D 55/22; F16D 65/123–128;
(Continued)

(56) References Cited

U.S. PATENT DOCUMENTS 5,612,110 A * 3/1997 Watremez ............. F16D 69/027
428/614
8,877,296 B2 * 11/2014 Lembach ............... F16D 65/127
427/451

(Continued)

FOREIGN PATENT DOCUMENTS

DE 10 2004 052 673 A1 5/2006
DE 10 2006 004 156 A1 8/2007
(Continued)

OTHER PUBLICATIONS

International Search Report corresponding to PCT Application No. PCT/EP2020/063595, dated Jul. 21, 2020 (German and English language document) (5 pages).

*Primary Examiner* — Christopher P Schwartz
(74) *Attorney, Agent, or Firm* — Maginot, Moore & Beck LLP

(57) ABSTRACT

A friction brake body for a friction brake of a motor vehicle, in particular a brake disk, includes a base body made in particular from gray cast iron and having at least one wear resistant layer formed on a friction contact surface of the base body. The wear resistant layer is made from ferritic-austenitic steel and includes an incorporated hard material particle, in particular finely distributed hard material particle.

18 Claims, 2 Drawing Sheets

(51) Int. Cl.
*F16D 69/02* (2006.01)
*B23K 26/342* (2014.01)
*B23K 101/00* (2006.01)
*B23K 103/02* (2006.01)
*B23K 103/16* (2006.01)
*F16D 55/22* (2006.01)
*F16D 65/02* (2006.01)

(52) U.S. Cl.
CPC .......... *F16D 69/027* (2013.01); *B23K 26/342* (2015.10); *B23K 2101/006* (2018.08); *B23K 2103/02* (2018.08); *B23K 2103/16* (2018.08); *B32B 2250/02* (2013.01); *B32B 2475/00* (2013.01); *B32B 2605/00* (2013.01); *F16D 55/22* (2013.01); *F16D 2065/132* (2013.01); *F16D 2065/1344* (2013.01); *F16D 2200/0013* (2013.01); *F16D 2200/0021* (2013.01); *F16D 2200/0078* (2013.01); *F16D 2250/0076* (2013.01)

(58) Field of Classification Search
CPC .. F16D 69/02; F16D 69/027; F16D 2065/132; F16D 2065/1344; F16D 2069/005; F16D 2200/0004; F16D 2200/0008; F16D 2200/0013; F16D 2200/0021; F16D 2200/003; F16D 2200/0039; F16D 2200/0078; F16D 2250/0046; F16D 2250/0078; C23C 4/02; C23C 4/06; C23C 4/10; C23C 4/129
USPC .................................................. 188/218 XL
See application file for complete search history.

(56) References Cited

U.S. PATENT DOCUMENTS

| 10,197,121 | B2* | 2/2019 | Filip .................. C23C 14/34 |
| 11,661,985 | B2* | 5/2023 | Carminati ............ C23C 4/10 |
| | | | 188/218 XL |
| 2002/0179204 | A1 | 12/2002 | Brunson |
| 2009/0026026 | A1* | 1/2009 | Martino ............ C22C 29/005 |
| | | | 188/218 XL |
| 2017/0253945 | A1 | 9/2017 | Teraoka et al. |
| 2020/0072306 | A1* | 3/2020 | Rettig ............. C23C 28/3225 |
| 2020/0072307 | A1* | 3/2020 | Rettig ................ C23C 28/027 |
| 2021/0396291 | A1* | 12/2021 | Gries .................. F16D 13/64 |
| 2022/0213941 | A1* | 7/2022 | Potapenko .......... F16D 65/125 |
| 2022/0221015 | A1* | 7/2022 | Potapenko .......... B32B 15/01 |

FOREIGN PATENT DOCUMENTS

| DE | 10 2010 048 075 A1 | 4/2012 |
| DE | 10 2015 014 192 A1 | 9/2016 |
| EP | 1 336 054 B1 | 9/2008 |

* cited by examiner

FRICTION BRAKE BODY FOR A FRICTION BRAKE, FRICTION BRAKE AND METHOD FOR PRODUCING A FRICTION BRAKE BODY

This application is a 35 U.S.C. § 371 National Stage Application of PCT/EP2020/063595, filed on May 15, 2020, which claims the benefit of priority to Serial No. DE 10 2019 207 291.7, filed on May 18, 2019 in Germany, the disclosures of which are incorporated herein by reference in their entirety.

The disclosure relates to a friction brake element for a friction brake of a motor vehicle, in particular a brake disk, having a main element made, in particular, of gray cast iron and having at least one antiwear layer present on a frictional contact surface of the main element.

The disclosure further relates to a friction brake having at least one brake disk and having at least one movable brake pad assigned to the brake disk, and also a process for producing the above-described friction brake element.

BACKGROUND

Friction brakes for motor vehicles usually have, as friction brake elements, a brake disk and at least one brake pad which on being pressed together generate a frictional force which acts so as to reduce the speed of rotation. Here, the brake disk is usually fixed to a wheel of the motor vehicle and the brake pad is fixed to the vehicle body but can be moved so that it can be brought into contact with the brake disk. The friction arising as a result of the movement of the brake disk relative to the brake pad produces abrasion on the brake disk, which leads to wear of the brake disk and also to brake dust which gets into the surroundings.

It is therefore known that an antiwear layer which, in particular, forms the frictional contact surface facing the brake pad and ensures reduced abrasion compared to the main element can be provided.

SUMMARY

The disclosed friction brake element has the advantage that particularly low abrasion is ensured by an advantageous antiwear layer. The antiwear layer offers not only a high wear resistance but also a high corrosion resistance and also a high resistance to crack formation. According to the disclosure, the antiwear layer is made of ferritic-austenitic steel and comprises hard material particles to this end. The antiwear layer of the friction brake element of the disclosure thus comprises a ferritic-austenitic steel which has, in particular, a two-phase microstructure consisting of a ferritic matrix with incorporated austenite islands and also hard material particles which are distributed in the ferritic-austenitic steel. The ferritic-austenitic steel displays not only corrosion resistance but also in particular an excellent cracking resistance. At the phase boundaries, in particular at the transition from ferrite to the more ductile austenite, cracks that arise during cooling or under the thermomechanical stresses during braking operations come to a stop for fracture-mechanical reasons. The addition of the hard material particles increases the wear resistance, so that overall the abovementioned advantages are obtained. In particular, the hard material particles are finely dispersed in the antiwear layer in order to ensure homogeneity of the antiwear layer.

In a preferred further development, the antiwear layer comprises chromium and/or nitrogen in order to increase the corrosion resistance.

Furthermore, the hard material particles preferably have an average particle size of less than 50 µm. This results in an advantageous particle size for distribution in the matrix phase, with larger particle sizes which lead to more rapid wear of the brake lining on the brake pad being avoided. However, depending on the embodiment or use of the friction brake element, larger particle sizes can also be advantageous.

Carbides, oxides, nitrides or borides are particularly preferably present as hard material particles in the antiwear layer.

Furthermore, the proportion of hard material particles is preferably less than or equal to 70% by volume of the antiwear layer. As a result, mismatching of the coefficients of thermal expansion between antiwear layer and main element and the stresses in the friction brake element resulting therefrom during braking is advantageously limited so that no cracks or excessive stresses arise in the friction brake element. In addition, a proportion of the matrix phase (ferritic-austenitic steel) of at least 30% by volume is preferably present in order to ensure advantageous ductility and toughness of the layer.

In a preferred embodiment, an intermediate layer composed of pure ferritic-austenitic steel, i.e. without embedded hard material particles, is present between the antiwear layer and the main element. The intermediate layer, which has a particularly high corrosion and cracking resistance, gives the advantage that crack propagation in the antiwear layer under high thermomechanical stress is stopped by the cracking-resistant intermediate layer and exposure of the substrate which is susceptible to corrosion is thus prevented. This further increases the durability and the stressability of the friction brake element.

The disclosed friction brake is characterized by configuration of the brake disk as friction brake element according to the disclosure. The abovementioned advantages are obtained.

The disclosed process is characterized in that the antiwear layer is made of ferritic-austenitic steel having, in particular, finely distributed, embedded hard material particles. The abovementioned advantages are obtained.

The antiwear layer is preferably applied to the main element by laser buildup welding or thermal spraying.

Furthermore, the antiwear layer is preferably alloyed with chromium and/or nitrogen.

In addition, hard material particles having an average particle size of less than 50 µm are preferably used in order to avoid overstressing of the contact partner, i.e., for example, the brake pad, during braking.

Preferably, carbides, oxides, nitrides or borides are used as hard material particles.

An intermediate layer composed of pure ferritic-austenitic steel is optionally applied to the main element before application of the antiwear layer. This effects an overall increase in the cracking and corrosion resistance of the friction brake element, as indicated above.

The main element is particularly preferably pretreated mechanically before application of the antiwear layer and/or the intermediate layer.

BRIEF DESCRIPTION OF THE DRAWINGS

Further advantages and preferred features and combinations of features are derived, in particular, from the above description and also from the claims. The disclosure will be explained in more detail below with the aid of the drawing. The figures show:

DETAILED DESCRIPTION

Figure 1:
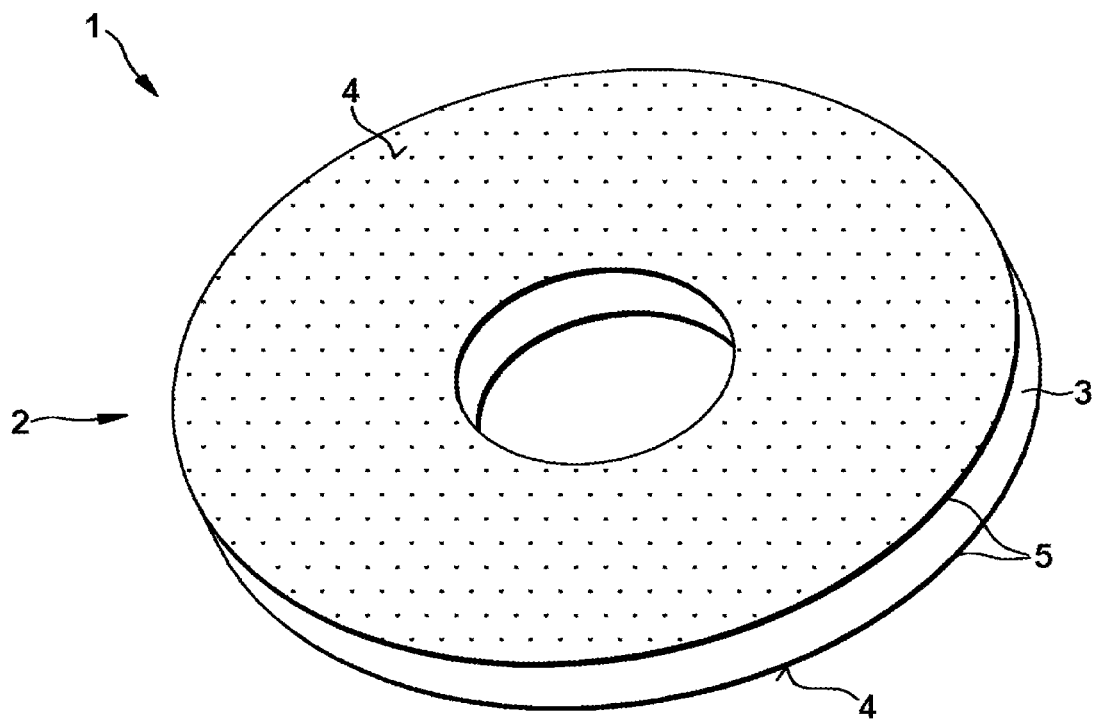
FIG. 1 an advantageous friction brake element in a simplified perspective view.

FIG. 1 shows, in a simplified depiction, a friction brake element 1 configured as brake disk 2 for a friction brake, which is not shown in more detail here, of a motor vehicle. The friction brake element 1 has a main element which is made of gray cast iron and has an annular configuration. A brake disk chamber which is optionally present on the brake disk 2 is not shown in FIG. 1.

On each of its two faces, the main element 3 has an annular frictional contact surface 4 which is formed by an antiwear layer 5 on the main element 3. During the intended use of the friction brake element 1, the antiwear layer 5 forms the contact partner of at least one movable brake lining or brake pad of the friction brake which can be pressed against the brake disk to effect frictional braking. Owing to the relative movement of brake disk and brake pad during braking, abrasion of the friction brake element 1 arises at the frictional contact surface 4. This abrasion leads firstly to wear of the friction brake element 1 and secondly to brake dust which can get into the surroundings.

To increase the wear and corrosion resistance and also the resistance to crack formation, the antiwear layer 5 is made of a ferritic-austenitic steel 6 and has, in particular, finely distributed, embedded hard material particles 7, which are indicated in simplified form by dots in FIG. 1.

Figure 2:
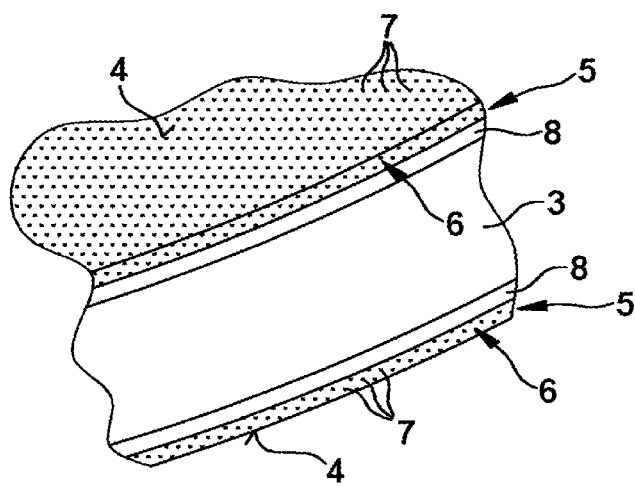
FIG. 2 a detailed sectional view of the friction brake element.

In the present working example, the antiwear layer 5 has a plurality of sublayers. FIG. 2 shows in relation to this a detailed sectional view of the friction brake element 1 in the region of the frictional contact surface 4. The antiwear layer 5 forms a surface layer of the friction brake element 1. In the present working example, an intermediate layer 8 composed of pure ferritic-austenitic steel is additionally present between the antiwear layer 5 containing hard material particles 7.

Ferritic-austenitic steels display excellent cracking resistance. In addition, cracks forming in the antiwear layer 5 are stopped by the intermediate layer 8, so that cracks in the antiwear layer 5 cannot extend into the main element 3.

The corrosion resistance of the antiwear layer 5 is preferably increased by alloying-in of chromium and/or nitrogen. The wear resistance or abrasion resistance at the frictional contact surface 4 is increased by the hard material particles present in the antiwear layer 5. The hard material particles 7 preferably have an average particle size of less than 50 μm to this end. Carbides, oxides, nitrides or borides, in particular, are provided as hard material particles 7. The proportion of hard material in the antiwear layer 5 is preferably not more than 70% by volume so that mismatching of the coefficients of thermal expansion between layer and main element and the stresses resulting therefrom in the friction brake element 1 do not become too high when braking is carried out.

Figure 3:
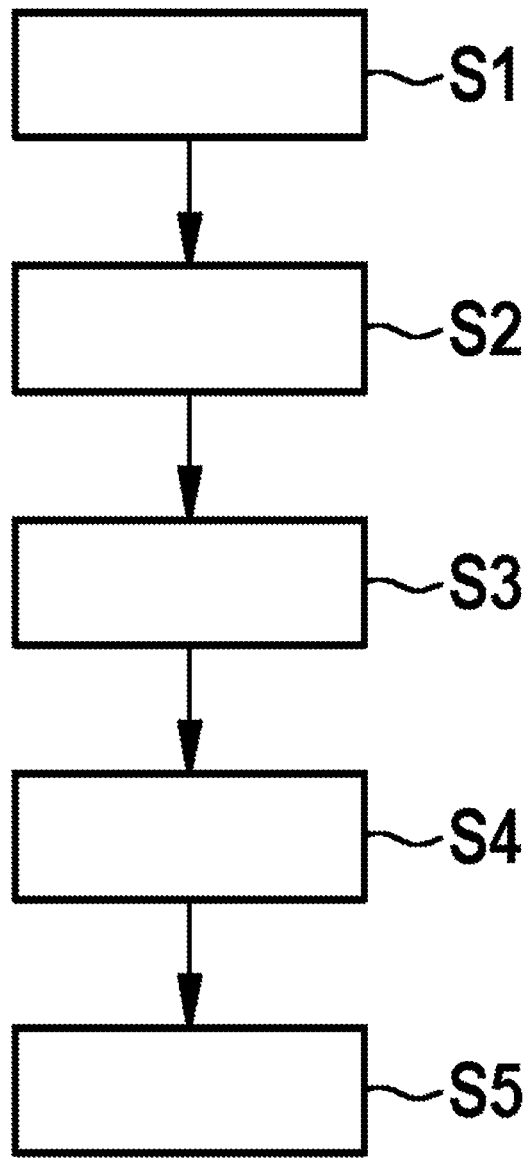
FIG. 3 a flow diagram to explain an advantageous process for producing the friction brake element.

FIG. 3 is intended to explain an advantageous process for producing the friction brake element 1 by means of a flow diagram. In a first step S1, the main element 3, which is in particular made of gray cast iron, is provided. In a subsequent step S2, at least one face of the main element 3 is pretreated mechanically, for example by means of grinding, to set a defined roughness.

In the following optional step S3, the intermediate layer composed of pure ferritic-austenitic steel is applied to the main element 3. Here, the intermediate layer 8 is preferably applied to the main element 3 by laser buildup welding or by means of thermal spraying processes.

The actual antiwear layer 5 is subsequently applied to the main element 3 or to the intermediate layer 8 in a step S4, with the hard material particles 7 being applied simultaneously with the matrix phase of ferritic-austenitic steel to the main element 3 or to the intermediate layer 8.

Finally, the finished friction brake element 1 is obtained in a step S5, with the surface of the antiwear layer 5 optionally being mechanically after-treated, in particular ground, in order to ensure a desired geometry and roughness for interaction with the assigned brake lining and/or brake pad of the friction brake.

The invention claimed is:

1. A friction brake element for a friction brake of a motor vehicle, comprising:
    a main element having a frictional contact surface;
    at least one antiwear layer disposed on the frictional contact surface, the at least one antiwear layer formed of ferritic-austenitic steel and having embedded hard material particles; and
    an intermediate layer composed of pure ferritic-austenitic steel disposed between the at least one antiwear layer and the main element.

2. The friction brake element as claimed in claim 1, wherein the at least one antiwear layer comprises chromium and/or nitrogen in order to increase the corrosion resistance.

3. The friction brake element as claimed in claim 1, wherein the hard material particles have an average particle size of less than 50 μm.

4. The friction brake element as claimed in claim 1, wherein the hard material particles include carbides, oxides, nitrides or borides.

5. The friction brake element as claimed in claim 1, wherein a proportion of hard material particles is less than or equal to 70% by volume of the at least one antiwear layer.

6. The friction brake element as claimed in claim 1, wherein the friction brake element is a brake disk.

7. The friction brake element as claimed in claim 1, wherein the main element is formed of gray cast iron.

8. The friction brake element as claimed in claim 1, wherein the embedded hard material particles are finely distributed hard material particles.

9. A process for producing a friction brake element for a friction brake of a motor vehicle comprising:
    forming a main element with at least one antiwear layer forming a frictional contact surface, the at least one antiwear layer formed of ferritic-austenitic steel having embedded hard material particles; and
    applying an intermediate layer composed of pure ferritic-austenitic steel to the main element before application of the at least one antiwear layer.

10. The process as claimed in claim 9, wherein the forming of the main element further comprises applying the at least one antiwear layer to the main element by laser buildup welding or thermal spraying.

11. The process as claimed in claim 9, wherein the forming of the main element further comprises alloying the at least one antiwear layer with chromium and/or nitrogen.

12. The process as claimed in claim 9, wherein the forming of the main element further comprises finely distributing the hard material particles in the at least one antiwear layer.

13. The process as claimed in claim 9, wherein the hard material particles have an average particle size of less than 50 μm.

14. The process as claimed in claim 9, wherein the hard material particles include carbides, oxides, nitrides or borides.

15. The process as claimed in claim 9, further comprising:
    mechanically pretreating the main element before application of the at least one antiwear layer.

16. The process as claimed in claim 9, wherein the friction brake element is a brake disk.

17. The process as claimed in claim 9, wherein the main element is formed of gray cast iron.

18. A friction brake for a motor vehicle, comprising:
    at least one brake disk comprising:
        a main element having a frictional contact surface; and
        at least one antiwear layer disposed on the frictional contact surface, the at least one antiwear layer formed of ferritic-austenitic steel and having embedded hard material particles; and
        an intermediate layer composed of pure ferritic-austenitic steel disposed between the at least one antiwear layer and the main element; and
    at least one movable brake pad assigned to the brake disk.

* * * * *